(12) United States Patent
Sylvester

(10) Patent No.: US 6,655,822 B1
(45) Date of Patent: Dec. 2, 2003

(54) TRAILER HITCH COVER

(76) Inventor: Ty M. Sylvester, 33165 Canyon Quail Trail, Agua Dulce, CA (US) 91390

( * ) Notice: Subject to any disclaimer, the term of this patent is extended or adjusted under 35 U.S.C. 154(b) by 0 days.

(21) Appl. No.: 10/193,848

(22) Filed: Jul. 11, 2002

(51) Int. Cl.[7] .............................................. F21W 101/02
(52) U.S. Cl. ........................................ 362/485; 362/806
(58) Field of Search .............................. 362/806, 546, 362/485, 505, 506

(56) References Cited

U.S. PATENT DOCUMENTS

| | | | | |
|---|---|---|---|---|
| 6,053,627 A | * | 4/2000 | Vo et al. ..................... | 362/485 |
| 6,357,899 B1 | * | 3/2002 | Craven ........................ | 362/485 |
| D464,919 S | * | 10/2002 | Pichan ........................ | D12/162 |
| 6,463,686 B1 | * | 10/2002 | Eisenbraun ................... | 40/591 |
| D471,137 S | * | 3/2003 | Shepherd et al. .......... | D12/162 |

* cited by examiner

*Primary Examiner*—Laura K. Tso

(57) ABSTRACT

Decorative trailer hitch covers protect and block a vehicle trailer hitching socket from view in a decorative manner. Decorative trailer hitch covers prevent water, dirt, and other debris from accumulating in the vehicle trailer hitching socket when it is not in use. Furthermore, the normally unattractive trailer hitching socket can be covered with an attractive, illuminated graphic or sign. In this manner, the driver can personalize his or her vehicle.

17 Claims, 2 Drawing Sheets

TRAILER HITCH COVER

BACKGROUND OF THE INVENTION

1. Field of the Invention

The present invention relates to a trailer hitch cover for use in connection with trailer hitches. The trailer hitch cover has particular utility in connection with protecting and blocking a vehicle trailer hitching socket from view in a decorative manner.

2. Description of the Prior Art

Decorative trailer hitch covers are desirable for protecting and blocking a vehicle trailer hitching socket from view in a decorative manner. Decorative trailer hitch covers prevent water, dirt, and other debris from accumulating in the vehicle trailer hitching socket when it is not in use. Furthermore, the normally unattractive trailer hitching socket can be covered with an attractive, illuminated graphic or sign. In this manner, the driver can personalize his or her vehicle.

The use of lighted modular trailer hitching socket covering systems, and methods of use is known in the prior art. For example, U.S. Pat. No. 6,053,627 to Vo et al. discloses a lighted modular trailer hitching socket covering systems, and method of use. However, the Vo et al. '627 patent does not have a foam rubber ring encircling the socket mating tongue element and has further drawbacks of requiring the removal of screws in order to change the hitching socket covering means element.

U.S. Pat. No. 5,979,094 to Brafford, Jr. discloses a protective trailer hitch lighted sign that protects the trailer hitch from damage from the elements. However, the Brafford, Jr. '094 patent does not have a foam rubber ring encircling the connecting piece, and additionally does not have locking tabs and receiving slots to secure the trailer hitch accessory sign.

Similarly, U.S. Pat. No. 4,800,471 to Lippert discloses a brake light attachment that converts a trailer hitch tongue receiving socket into a third brake light. However, the Lippert '471 patent does not have a foam rubber ring encircling the shank, and cannot display a decorative sign or graphic.

In addition, U.S. Pat. No. 6,302,567 to Gamble, Sr. discloses an attachable vehicle warning light that can be elevated. However, the Gamble, Sr. '567 patent does not have a foam rubber ring encircling the hitch insert portion, and also does not display a decorative sign or graphic.

Furthermore, U.S. Pat. No. 6,012,828 to Pearce et al. discloses a device for attaching a light to a trailer hitch frame via tie wraps. However, the Pearce et al. '828 patent does not protect the trailer hitch socket, and further lacks the ability to be inserted into the trailer hitch socket.

Lastly, U.S. Pat. No. Des. 413,291 to Corns, Jr. discloses a sports helmet outfitted automotive hitch cover that provides a decorative covering. However, the Corns, Jr. '291 patent does not illuminate, and has the additional deficiency of not having a removable decorative covering element.

While the above-described devices fulfill their respective, particular objectives and requirements, the aforementioned patents do not describe a decorative trailer hitch cover that allows protecting and blocking a vehicle trailer hitching socket from view in a decorative manner. The above patents make no provision for a foam rubber ring encircling an element that is inserted into a trailer hitch. Furthermore, the Lippert '471 patent, the Gamble, Sr. '567 patent, and the Pearce et al. '828 patent do not display a decorative sign or graphic. Finally, the Corns, Jr. '291 patent does not illuminate or have a removable decorative sign or graphic.

Therefore, a need exists for a new and improved decorative trailer hitch cover that can be used for protecting and blocking a vehicle trailer hitching socket from view in a decorative manner. In this regard, the present invention substantially fulfills this need. In this respect, the decorative trailer hitch cover according to the present invention substantially departs from the conventional concepts and designs of the prior art, and in doing so provides an apparatus primarily developed for the purpose of protecting and blocking a vehicle trailer hitching socket from view in a decorative manner.

SUMMARY OF THE INVENTION

In view of the foregoing disadvantages inherent in the known types of lighted modular trailer hitching socket covering systems, and methods of use now present in the prior art, the present invention provides an improved decorative trailer hitch cover, and overcomes the above-mentioned disadvantages and drawbacks of the prior art. As such, the general purpose of the present invention, which will be described subsequently in greater detail, is to provide a new and improved decorative trailer hitch cover which has all the advantages of the prior art mentioned heretofore and many novel features that result in a decorative trailer hitch cover which is not anticipated, rendered obvious, suggested, or even implied by the prior art, either alone or in any combination thereof.

To attain this, the present invention essentially comprises a hitch insert, a decorative element support attached to the end of the hitch insert which is not inserted into the hitch socket, an illumination source contained within the decorative element support; and a decorative element removably attached to the decorative element support.

There has thus been outlined, rather broadly, the more important features of the invention in order that the detailed description thereof that follows may be better understood and in order that the present contribution to the art may be better appreciated.

The invention may also include a foam rubber ring encircling the hitch insert. There may be holes cut in the foam rubber ring and the hitch insert to allow for the insertion of a retaining pin. The illumination source may consist of a lightbulb and an electrical cord which can be plugged into the wiring harness connector of the vehicle. The decorative element may be secured to the decorative element support via locking tabs and receiving slots. There are, of course, additional features of the invention that will be described hereinafter and which will form the subject matter of the claims attached.

Numerous objects, features and advantages of the present invention will be readily apparent to those of ordinary skill in the art upon a reading of the following detailed description of presently current, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved decorative trailer hitch cover that has all of the advantages of the prior art lighted modular trailer hitching socket covering systems, and methods of use and none of the disadvantages.

It is another object of the present invention to provide a new and improved decorative trailer hitch cover that may be easily and efficiently manufactured and marketed.

An even further object of the present invention is to provide a new and improved decorative trailer hitch cover that has a low cost of manufacture with regard to both materials and labor, and which accordingly is then susceptible of low prices of sale to the consuming public, thereby making such decorative trailer hitch cover economically available to the buying public.

Still another object of the present invention is to provide a new decorative trailer hitch cover that provides in the apparatuses and methods of the prior art some of the advantages thereof, while simultaneously overcoming some of the disadvantages normally associated therewith.

Even still another object of the present invention is to provide a decorative trailer hitch cover for protecting and blocking a vehicle trailer hitching socket from view in a decorative manner. This allows the user to protect the vehicle trailer hitching socket from accumulating water, dirt, and other debris.

Still yet another object of the present invention is to provide a decorative trailer hitch cover for protecting and blocking a vehicle trailer hitching socket from view in a decorative manner. This makes it possible to hide the vehicle trailer hitching socket from view.

A further object of the present invention is to provide a decorative trailer hitch cover for protecting and blocking a vehicle trailer hitching socket from view in a decorative manner. This enables the user to personalize their vehicle.

A still further object of the present invention is to provide a decorative trailer hitch cover for protecting and blocking a vehicle trailer hitching socket from view in a decorative manner. This makes it possible to enhance the visibility of the decorative element at night.

An additional object of the present invention is to provide a decorative trailer hitch cover for protecting and blocking a vehicle trailer hitching socket from view in a decorative manner. This allows the user to change the decorative element easily.

Lastly, it is an object of the present invention to provide a new and improved decorative trailer hitch cover for protecting and blocking a vehicle trailer hitching socket from view in a decorative manner.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated current embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures.

DESCRIPTION OF THE CURRENT EMBODIMENT

Figure 1:
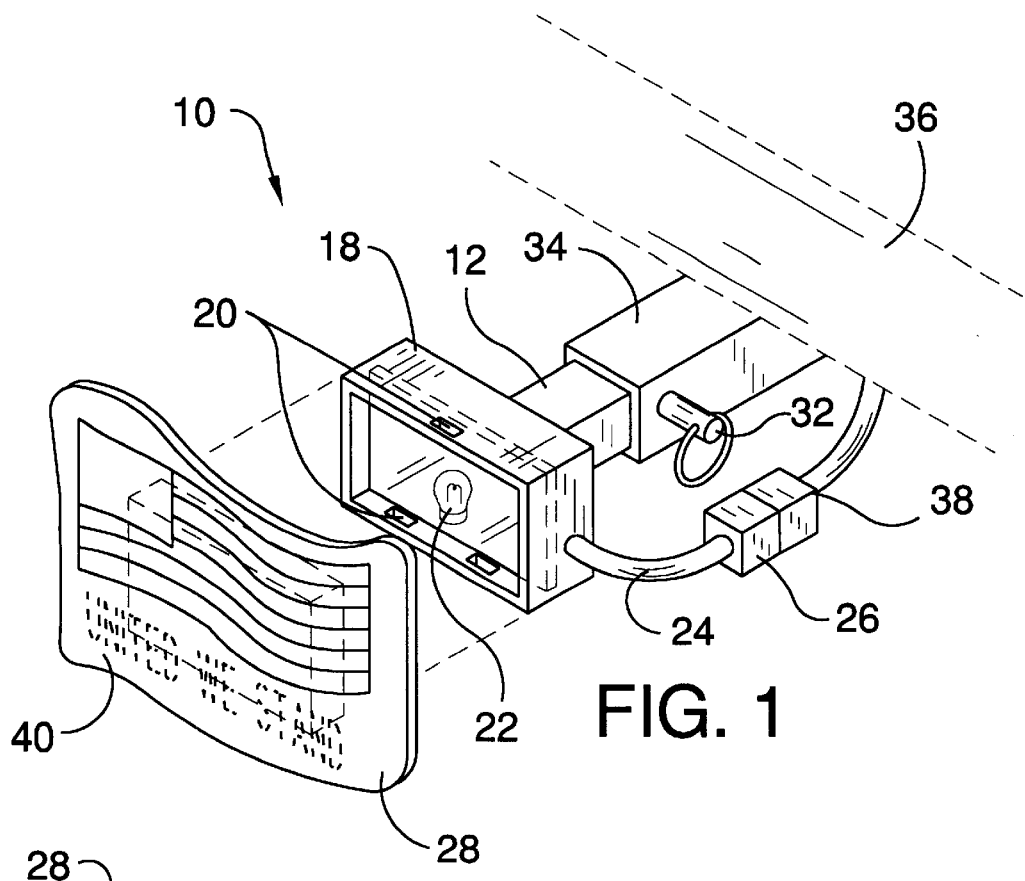
FIG. 1 is a top perspective view of the current embodiment of the decorative trailer hitch cover constructed in accordance with the principles of the present invention.
Figure 2:
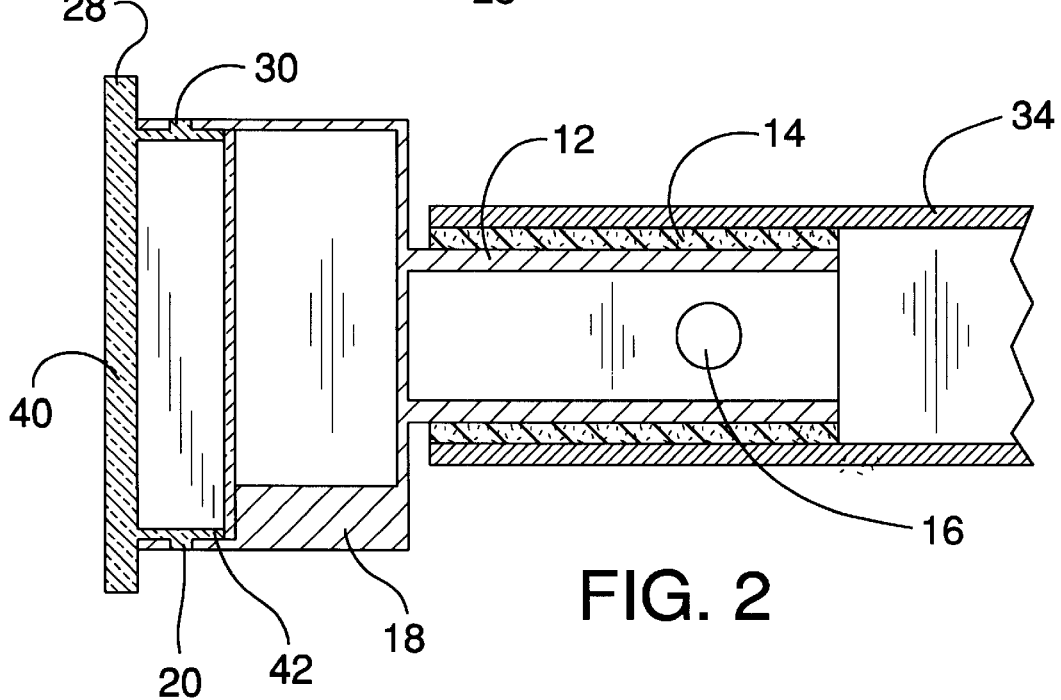
FIG. 2 is a top sectional view of the decorative trailer hitch cover of the present invention.
Figure 3:
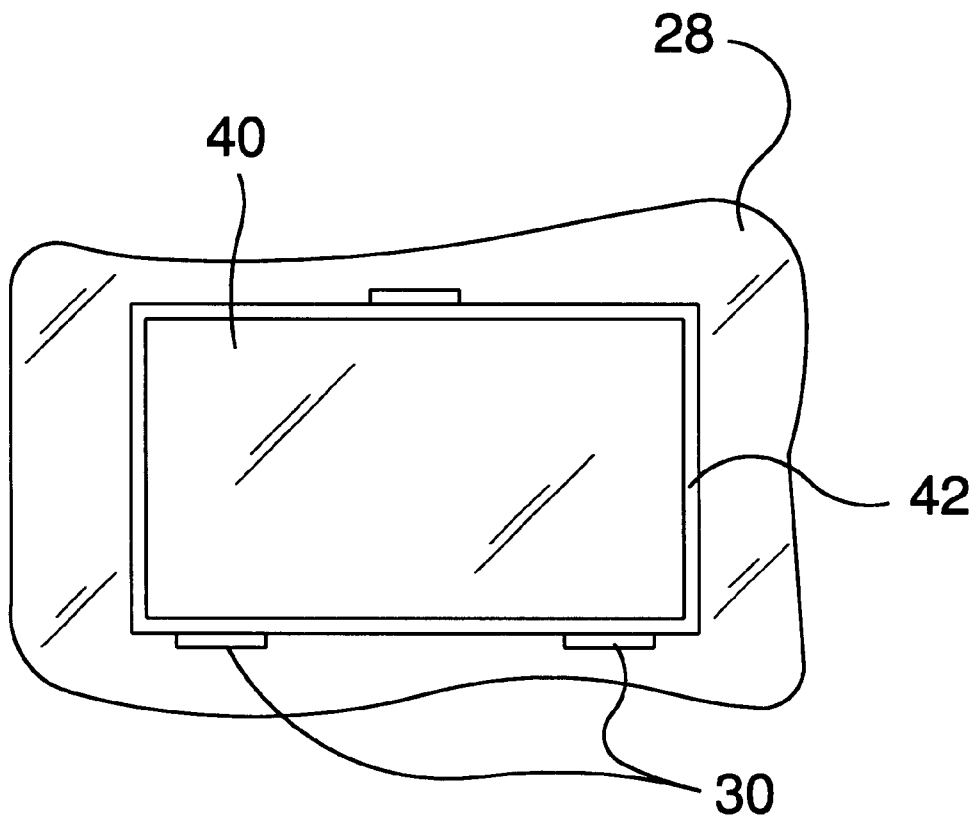
FIG. 3 is a rear view of the decorative element of the present invention.

Referring now to the drawings, and particularly to FIGS. 1–3, a current embodiment of the decorative trailer hitch cover of the present invention is shown and generally designated by the reference numeral 10.

In FIG. 1, a new and improved decorative trailer hitch cover 10 of the present invention for protecting and blocking a vehicle trailer hitching socket from view in a decorative manner is illustrated and will be described. More particularly, the decorative trailer hitch cover 10 has a hitch insert 12 made of steel in the current embodiment. Hitch insert 12 is secured in hitch 34 by pin 32. Hollow box 18, made of steel, is attached to the end of hitch insert 12 that is not inserted into hitch 34. Lightbulb 22 is housed within hollow box 18. Hollow box 18 has receiving slots 20 cut in the top and bottom sidewalls. Decorative element 40 with placard 28 removably attaches to hollow box 18 utilizing receiving slots 20 in a manner which will be explained in detail in the discussion of FIG. 2. In the current embodiment, placard 28 is made of plastic. Electrical cord 24 provides electricity to lightbulb 22 from wiring harness connector 38. In the current embodiment, electrical connector 26 takes the form of a four-piece connector. Note that the pin 32, hitch 34, wiring harness connector 38, and the broken line illustrating a bumper 36 are for illustrative purposes only and are not part of the current invention.

Moving on to FIG. 2, a new and improved decorative trailer hitch cover 10 of the present invention for protecting and blocking a vehicle trailer hitching socket from view in a decorative manner is illustrated and will be described. More particularly, the hitch insert 12 is inserted into hitch 34. Hitch insert 12 is retained in place by foam rubber ring 14 and by a pin that will be inserted through pin receiving hole 16. Hollow box 18 is shown, along with receiving slots 20. Decorative element 40 is shown with the back of placard 28 visible, showing the decorative element support insert 42 with locking tabs 30. Locking tabs 30 fit into receiving slots 20, removably attaching decorative element 40 to hollow box 18. Note that the hitch 34 is for illustrative purposes only and is not part of the current invention.

Concluding with FIG. 3, a new and improved decorative element 40 of the present invention for protecting and blocking a vehicle trailer hitching socket from view in a decorative manner is illustrated and will be described. More particularly, the decorative element 40 has the rear face of placard 28 attached to the decorative element support insert 28. Locking tabs 30 are visible on decorative element support insert 42.

In use, it can now be understood that hitch insert 12 with ring 14 is inserted into hitch 34 and secured by pin 32. An electrical connection with the vehicle is established by connecting electrical connector 26 to wiring harness connector 38. A variety of decorative elements 40 can be removably attached to hollow box 18 via locking tabs 30.

While a current embodiment of the decorative trailer hitch cover has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, any suitable sturdy material such as plastic, aluminum, wood, titanium, or carbon fiber composite may be used instead of the steel hitch insert described. Also, the steel hollow box may also be made of heavy-duty plastic, aluminum, wood, titanium, carbon fiber composite, or similar material. Furthermore, plastic or rubber may be used instead of the foam rubber ring described.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A decorative trailer hitch cover comprising:
    a hitch insert having opposing ends and sidewalls;
    a decorative element support having a front face and a rear face with said rear face attached to one end of said hitch insert;
    an illumination source contained within said decorative element support;
    a decorative element support insert having sidewalls and opposing ends with one end removably inserted into said front face of said decorative element support;
    a plurality of locking tabs attached to said sidewalls of said decorative element support insert; and
    a placard having a front face and a rear face with said rear face attached to said opposing end of said decorative element support insert so that said placard is external to the decorative element support.

2. The decorative trailer hitch cover as defined in claim 1, further comprising a pin receiving hole wherein said sidewalls of said hitch insert comprise a hole therein to comprise said pin receiving hole.

3. The decorative trailer hitch cover as defined in claim 1, further comprising a ring having sidewalls enclosing said sidewalls of said hitch insert.

4. The decorative trailer hitch cover as defined in claim 3, further comprising a receiving hole wherein said sidewalls of said ring comprise a hole therein to comprise said receiving hole.

5. The decorative trailer hitch cover as defined in claim 4, wherein said ring is selected from the group consisting of plastic, rubber, and foam rubber.

6. The decorative trailer hitch cover as defined in claim 1, wherein said hitch insert is selected from the group consisting of plastic, steel, aluminum, wood, titanium, and carbon fiber composite.

7. The decorative trailer hitch cover as defined in claim 1, wherein said decorative element support is selected from the group consisting of plastic, steel, aluminum, wood, titanium, and carbon fiber composite.

8. The decorative trailer hitch cover as defined in claim 1, wherein said decorative element support comprises:
    a hollow box having sidewalls; and
    a decorative element attachment mechanism attached to said box.

9. The decorative trailer hitch cover as defined in claim 8, wherein said decorative element attachment mechanism comprises receiving slots wherein said sidewalls of said hollow box comprise slits therein to comprise said receiving slots.

10. The decorative trailer hitch cover as defined in claim 1, wherein said illumination source comprises:
    a lightbulb;
    an electrical cord having opposing ends with one end attached to said lightbulb; and
    an electrical connector attached to said opposing end of said electrical cord.

11. The decorative trailer hitch cover as defined in claim 10, wherein said placard is made of plastic.

12. The decorative trailer hitch cover as defined in claim 10, wherein said electrical connector is a four-piece connector having three female connections and one male connection.

13. A decorative trailer hitch cover comprising:
    a hitch insert having opposing ends and sidewalls;
    a ring having sidewalls enclosing said sidewalls of said hitch insert;
    a decorative element support having a front face and a rear face with said rear face attached to one end of said hitch insert;
    an illumination source contained within said decorative element support;
    a decorative element support insert having sidewalls and opposing ends with one end removably inserted into said front face of said decorative element support;
    a plurality of locking tabs attached to said sidewalls of said decorative element support insert; and
    a placard having a front face and a rear face with said rear face attached to said opposing end of said decorative element support insert so that said placard is external to the decorative element support.

14. The decorative trailer hitch cover support as defined in claim 13, wherein said decorative element support comprises:
    a hollow box having sidewalls; and
    a decorative element attachment mechanism attached to said box.

15. The decorative trailer hitch cover as defined in claim 13, wherein said decorative element attachment mechanism comprises receiving slots wherein said sidewalls of said hollow box comprise slits therein to comprise said receiving slots.

16. The illumination source as defined in claim 13, wherein said illumination source comprises:
    a lightbulb;
    an electrical cord having opposing ends with one end attached to said lightbulb; and
    an electrical connector attached to said opposing end of said electrical cord.

17. A decorative trailer hitch cover comprising:

a hitch insert having opposing ends and sidewalls;

a pin receiving hole wherein said sidewalls of said hitch insert comprise a hole therein to comprise said pin receiving hole;

a foam rubber ring having sidewalls enclosing sidewalls of said hitch insert;

a receiving hole wherein said sidewalls of said ring comprise a hole therein to comprise said receiving hole;

a hollow box having sidewalls, a front face and a rear face with said rear face attached to one end of said hitch insert;

receiving slots wherein said sidewalls of said hollow box comprise slits therein to comprise said receiving slots;

a lightbulb contained within said decorative element support;

an electrical cord having opposing ends with one end attached to said lightbulb;

an electrical connector attached to said opposing end of said electrical cord;

a decorative element support insert having sidewalls and opposing ends with one end removably inserted into said hollow box;

a placard having a front face and a rear face with said rear face attached to said opposing end of said decorative element support insert so that said placard is external to said hollow box; and locking tabs attached to said sidewalls of said decorative element support insert.

* * * * *